US006675532B2

(12) United States Patent
Fidotti

(10) Patent No.: US 6,675,532 B2
(45) Date of Patent: Jan. 13, 2004

(54) DEVICE FOR DELIVERING AN IRRIGATION LIQUID FOR THE CULTIVATION OF PLANTS IN POTS, PLANT CONTAINER AND CONTAINER ASSEMBLY INCLUDING SAID DEVICE

(76) Inventor: Giampiero Fidotti, Via Francesco Ripandelli, 8, I-00149 Rome (IT)

( * ) Notice: Subject to any disclaimer, the term of this patent is extended or adjusted under 35 U.S.C. 154(b) by 90 days.

(21) Appl. No.: 09/803,932

(22) Filed: Mar. 13, 2001

(65) Prior Publication Data

US 2001/0029699 A1 Oct. 18, 2001

(30) Foreign Application Priority Data

Apr. 14, 2000 (EP) .............................. 00830288

(51) Int. Cl.⁷ ............................................. A01G 25/00
(52) U.S. Cl. ............................................................ 47/79
(58) Field of Search .............................. 47/79, 80, 81

(56) References Cited

U.S. PATENT DOCUMENTS

| 1,216,642 A | * | 2/1917 | White ............................ 47/80 |
| 3,220,144 A | * | 11/1965 | Green ............................ 47/80 |
| 3,758,987 A | * | 9/1973 | Crane, Jr. ..................... 47/38.1 |
| 4,175,354 A | | 11/1979 | Anderson |
| 6,038,814 A | * | 3/2000 | Miotto ........................... 47/79 |
| 6,052,942 A | * | 4/2000 | Chu ............................ 47/48.5 |
| 6,536,160 B1 | * | 3/2003 | Morlier et al. ................. 47/79 |

FOREIGN PATENT DOCUMENTS

| DE | 2 447 230 A | * | 4/1976 | .......... A01G/27/00 |
| DE | 2 528 748 A1 | | 12/1976 | |
| DE | 299 03 986 U | * | 4/1999 | .......... A01G/27/00 |
| DE | 299 03 986 U1 | | 7/1999 | |
| GB | 2 272 142 A | | 5/1994 | |
| GB | 2 364 624 A | * | 6/2002 | .......... A01G/27/00 |
| WO | WO 87/060695 | | 10/1987 | |

* cited by examiner

Primary Examiner—Charles T. Jordan
Assistant Examiner—Susan C. Alimenti
(74) Attorney, Agent, or Firm—Sughrue Mion, PLLC

(57) ABSTRACT

A device (2, 102, 202) for delivering an irrigation liquid (L) for the cultivation of plants comprises an elongated element (9) for the upwelling of the irrigation liquid (L) from a first storage zone (A1) of the irrigation liquid (L) towards a hollow body (14) wherein a second storage zone (A2) of said liquid (L) is defined. The hollow body (14) is intended to be immersed—during use—in the plant cultivation medium (C) and is provided with at least one liquid-permeable portion (36) capable of delivering by diffusion the irrigation liquid (L) towards the cultivation medium (C). Advantageously, the delivering device (2, 102, 202) allows to ensure that the irrigation of the cultivation medium (C) occurs in optimum conditions for the growth and/or the preservation of the plant.

16 Claims, 7 Drawing Sheets

DEVICE FOR DELIVERING AN IRRIGATION LIQUID FOR THE CULTIVATION OF PLANTS IN POTS, PLANT CONTAINER AND CONTAINER ASSEMBLY INCLUDING SAID DEVICE

DESCRIPTION

1. Field of the Invention

The present invention relates to a device for delivering an irrigation liquid for the cultivation of green plants in pots of the type indicated in the preamble of the attached claim 1.

2. Prior Art

In the field of irrigation systems for green plants in pots, a long felt need is that of providing efficient "sub-irrigation" systems, that is, systems adapted to provide the irrigation liquid to the plant from the bottom.

"Sub-irrigation" systems of the known type are essentially divided into two different categories—each one with different variants—using a different operating principle.

A first sub-irrigation system of the known type, currently the most widespread, provides for the use of a container for housing the soil, under which a reservoir for storing the irrigation liquid is provided, which is structurally independent from the container. Between the container and the reservoir a space is provided so as to prevent the irrigation liquid from coming into contact with the soil.

In this case, the natural evaporation of water creates a certain humidity in the soil itself, whereas the plants tend to develop root systems that slowly tend to protrude into the lower reservoir and thus into the irrigation liquid.

A first disadvantage of this sub-irrigation system is essentially related to the constant and unavoidable evaporation of the irrigation liquid, which must be added with a certain frequency in the storage reservoir.

On the other hand, another disadvantage is related to the time needed for ensuring the subsistence of the plants, which is only attained when the root system of the plants has sufficiently developed itself so as to reach the irrigation liquid lying below.

A second sub-irrigation system of the known type, described for example in European patent application EP 0 515 207, provides for the use of the microcapillarity of a porous material housed within an elongated hollow element having a first end immersed in a reservoir for storing the irrigation liquid, and a second end which may be either substantially extending perfectly flush with the soil to be irrigated or which may be positioned within the same.

Also in this case, the soil is housed in a container under which the reservoir for storing the irrigation liquid is housed, which is structurally independent from the container itself.

Although this second sub-irrigation system is improved with respect to the previous one, especially in terms of a more correct irrigation of the soil, nevertheless it possesses some drawbacks that have not been overcome yet, and which are essentially related to the following factors:

i) an uneven irrigation of the soil, which is humidified only in a localized way, that is, in the vicinity of the end of the elongated hollow element lying perfectly flush with or positioned in the soil;

ii) an extremely slow feeding rate of the irrigation liquid, which in most cases is not proportional per se to the drying rate of the soil; and iii) the considerable size of the system as a whole, the soil to be watered being equal; this is due to the presence of the reservoir for storing the irrigation liquid under the container for housing the soil.

SUMMARY OF THE INVENTION

Thus, the technical problem underlying the present invention is that of overcoming the drawbacks of the sub-irrigation systems of the prior art, ensuring in particular that the soil is irrigated in optimum conditions for the growth and/or the preservation of the plant.

According to a first aspect of the invention, this problem is solved by a device for delivering an irrigation liquid for the cultivation of plants comprising an elongated element (9) for the capillary upwelling of the irrigation liquid (L) from a first storage zone (A1) of the irrigation liquid (L) to a plant cultivation medium (C), said elongated element (9) being provided with means for putting in liquid communication at least one liquid inlet opening (12, 29) to be positioned in the first storage zone (A1) with at least one liquid outlet opening (13, 38) to be positioned outside of the first storage zone (A1), and a hollow body (14) wherein a second storage zone (A2) of the irrigation liquid (L) is defined and which is intended to be immersed—during use—in the plant cultivation medium (C), said hollow body (14) being provided with at least one liquid-permeable portion (36) and being fastened in a liquid-tight manner to said elongated element (9) around said liquid outlet opening (13, 38).

In the following description and in the subsequent claims, the expression "plant cultivation medium" is used to indicate any suitable material for the germination, the growth and the vegetation of a plant, such as for example soil or material in gel form.

On the other hand, in the following description and in the subsequent claims, the expression "irrigation liquid" is used to indicate any suitable liquid adapted to ensure the correct development and the correct vegetative activity of a plant, such as for example water, to which a fertilizer may possibly be added.

Advantageously, the delivering device of the invention allows to accomplish an optimum irrigation of the plant cultivation medium thanks to the provision of a hollow body which, during use, is immersed in the cultivation medium, and in which a second zone for storing the irrigation liquid is defined, such zone being in constant fluid communication with the first storage zone thanks to an elongated element extending between the same.

The hollow body is provided with at least one liquid-permeable portion and, as such, it delivers the irrigation liquid towards the plant cultivation medium, as a function of the humidity of said medium.

In this way, the delivering device of the invention favors the drying of the superficial layer of the plant cultivation medium, so as to ensure a continuous oxygenation of the same, and it irrigates in a natural way only the deepest layers of the plant cultivation medium, so as to obtain an optimum, constant and balanced humidification of the same, always proportional to the liquid requirements of the plant.

Advantageously, the delivering device of the invention also enables to ensure a long duration of the irrigation liquid, which is delivered only to the extent to which the same is actually needed, thus obviating the need of continuous liquid additions into the first storage zone.

Advantageously, the delivering device of the invention may be used both with an ad hoc plant container and with a conventional plant container, provided that—as it will be better shown hereinafter—suitable measures are taken for defining below the container an airspace adapted to receive the irrigation liquid.

Thus, according to a second aspect thereof, the invention provides, for solving the above-identified technical problem, a plant container, a container assembly and a delivering device.

In a further aspect thereof, finally, the invention provides for solving the above-identified technical problem by a method for delivering an irrigation liquid to a plant cultivation medium.

BRIEF DESCRIPTION OF THE DRAWINGS

Additional features and advantages of the present invention will become more clearly apparent from the following detailed not limitative description of some preferred embodiments of the delivering device, of the plant container, and of the container assembly according to the invention, made hereinafter as an indication with reference to the attached drawings. In the drawings.

DETAILED DESCRIPTION OF PREFERRED EMBODIMENTS

Figure 1:
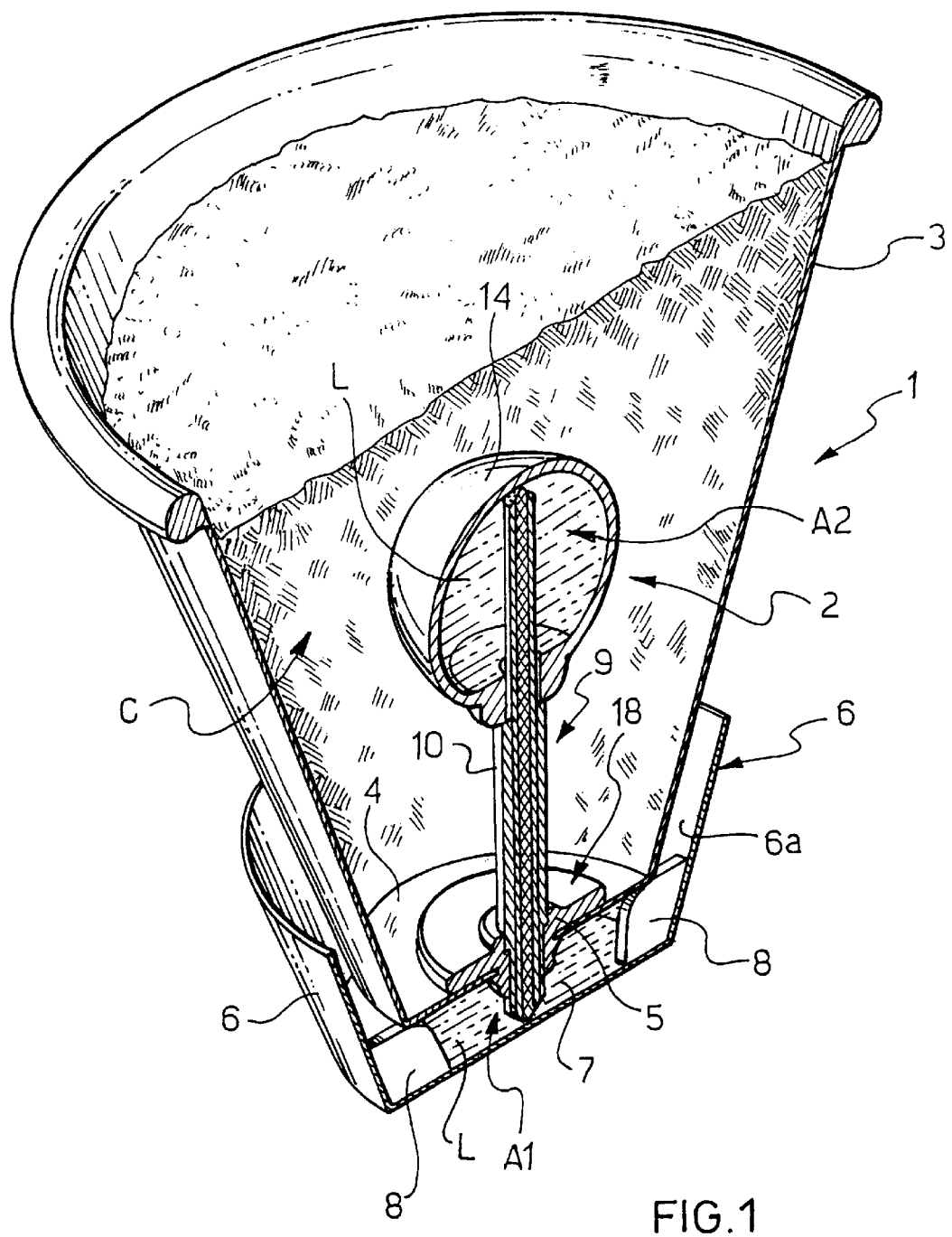
FIG. 1 shows a perspective cross-sectional view of a container assembly for the cultivation of plants, including a first embodiment of a delivering device according to the invention.
Figure 2:
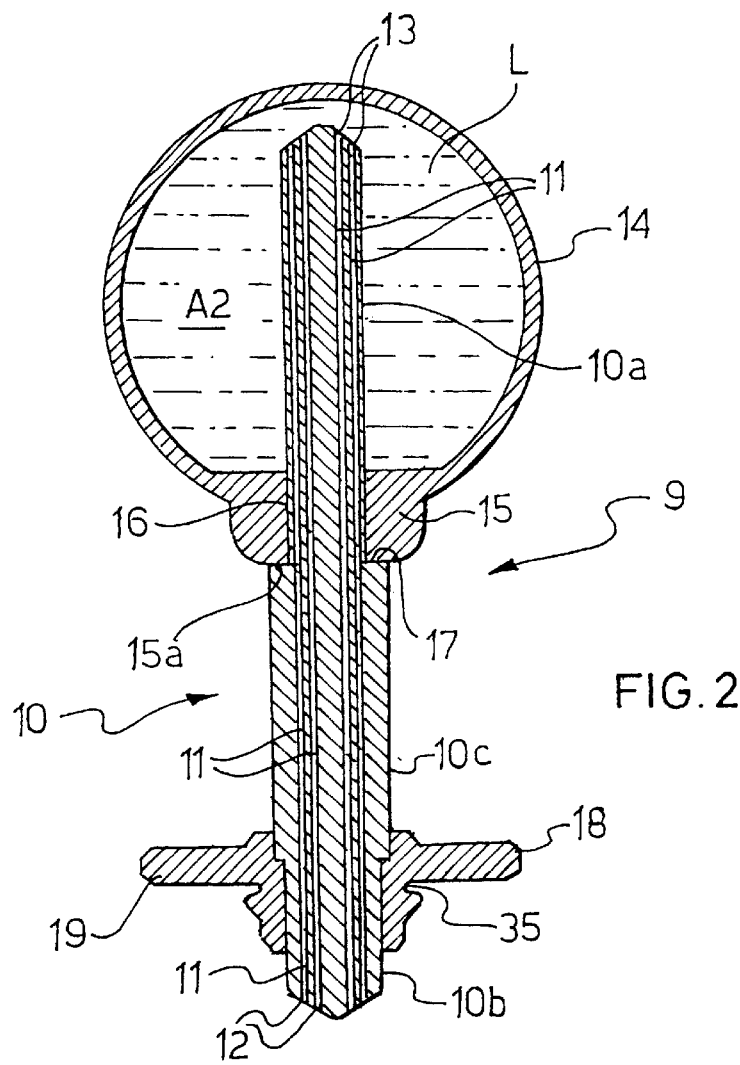
FIG. 2 shows an enlarged cross-sectional view of the delivering device of FIG. 1.
Figure 3:
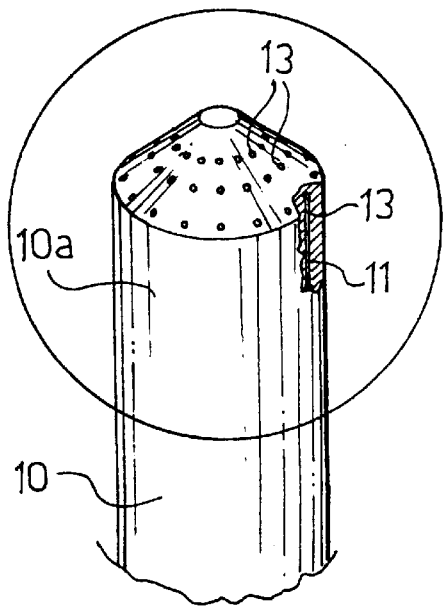
FIG. 3 shows a further enlarged perspective view of some details of a free end of an elongated connection element of the delivering device of FIG. 1.

With reference to FIGS. 1–3, reference numeral 1 generally indicates a container assembly for the cultivation of plants, including a first embodiment of a delivering device according to the invention, in its turn generally indicated with reference numeral 2.

In this embodiment, the container assembly 1 comprises at least one pot 3 for housing a suitable plant cultivation medium C, for example soil of the known type.

The pot 3 is provided with a bottom wall 4, in its turn provided with a through hole 5 through which the delivering device 2 is mounted preferably in a fluid-tight manner.

The container assembly 1 also comprises a pot dish 6 forming with the pot 3 an airspace 7 wherein a first storage zone, indicated with A1 in FIG. 1, of a suitable irrigation liquid L, for example water, is defined.

Preferably, the airspace 7 is defined between the pot 3 and the pot dish 6 by means of spacer means 8, for example constituted by a plurality of ribs which are radially inwardly extending from the side wall 6a of the pot dish and which are angularly offset with respect to each other.

Advantageously, the pot 3 may be of conventional type and may be made of a suitable material, such as for example terracotta, plastics or ceramics.

The delivering device 2 comprises an elongated element 9 for the upwelling of the irrigation water from the first storage zone A1, defined in the airspace 7, towards the soil C.

In this example, the elongated element 9 is constituted by an essentially cylindrical shank 10, made of a suitable substantially liquid-impermeable material so as to prevent the irrigation water from permeating from its side walls to the soil C.

For the purposes of the invention, a suitable substantially liquid-impermeable material may be selected among the liquid-impermeable plastics materials, such as for example polypropylene or polyethylene.

The shank 10 is internally provided with a plurality of longitudinal channels 11 having a diameter preferably smaller than 1 mm, adapted to promote—during use—the upwelling by capillarity of the irrigation water L from the first storage zone A1 defined in airspace 7.

Thus the channels 11, which hereinafter shall be indicated with the expression "capillary channels", constitute as many means adapted to put in liquid communication a plurality of liquid inlet openings 12—formed at a free end of the capillary channels 11 and adapted to be positioned in the first storage zone A1—with a plurality of liquid outlet openings 13, adapted to be positioned outside of the above zone (FIG. 2).

More particularly, the outlet openings 13 of the irrigation water L are positioned within a hollow body 14 having a substantially spherical shape, in which a second storage zone of the irrigation water L, indicated with A2, is defined.

Advantageously, the hollow body 14 is intended to be immersed—during use—in the cultivation soil C of the plant, and is fastened in a liquid-tight manner, for example glued, to the shank 10 around the outlet openings 13 of the capillary channels 11.

In order to facilitate the assembly operations of the hollow body 14 onto the shank 10 and the subsequent fastening to the same, the body 14 is provided with a substantially cylindrical bottom base 15, axially provided with a central hole 16 engaged by an upper portion 10a of the shank 10 having a reduced diameter with respect to a central portion 10c of the same (FIG. 2).

In this embodiment, the base 15 is integrally formed with the hollow body 14, and is provided with a substantially planar lower face 15a in abutting relationship with an annular surface 17 radially formed in the shank 10 and forming, in its turn, a supporting base for the hollow body 14.

Thus, the desired liquid-tight assembly of the hollow body 14 may be effectively accomplished by applying a suitable adhesive on the annular surface 17 or at the central hole 16, or in both positions.

In this embodiment, the length of the upper portion 10a of the shank 10 is preferably selected so that the upper end of the shank 10, wherein the outlet openings 13 for the irrigation water L are provided, is positioned in the upper portion of the second storage zone A2.

In this way, it is advantageously possible to facilitate the filling operations of the hollow body 14, i.e., of the second storage zone A2, by the irrigation water L.

In this embodiment, the hollow body 14 is substantially entirely constituted by a suitable liquid-permeable material which—preferably—is also substantially noncompressible.

For the purposes of the invention, a suitable substantially liquid-permeable material may be selected among porous materials, such as for example terracotta, ceramics, porous plastics materials, such as for example polyethylene, porous polyurethane, or sintered plastics materials.

In a preferred embodiment, the shank 10 of the delivering device 2 is mounted in a liquid-tight manner through the bottom wall 4 of the pot 3 by means of a substantially annular sealing element 18 housed in the through hole 5 of the bottom wall 4.

Preferably, the sealing element 18 is coaxially mounted around a lower portion 10b of the shank 10 having a reduced diameter with respect to the central portion 10c of the same, and is provided with at least one flange 19 in abutting relationship with the bottom wall 4.

Preferably, the sealing element 18 is a one-piece element integrally made of a suitable elastomeric material, such as for example silicone or polyurethane rubber.

Preferably, the sealing element 18 is provided with an annular groove 35 wherein the hole 5 of the bottom wall 4 of the pot 3 is housed with mating engagement.

With reference to the device described above and to FIGS. 1–3, an embodiment of a method according to the invention for delivering the irrigation water L towards the soil C for cultivating a plant (not shown) housed in the pot 3, will now be described.

In a first step, the first storage zone A1 of the irrigation water L is arranged beneath the pot 3, placing the pot 3 on the ribs 8 extending from the pot dish 6.

Then, the portion A1 is filled with the irrigation water L, which is added up to a level at least higher than the level of the inlet openings 12 of the capillary channels 11, and preferably in such a way as to fill the entire airspace 7.

In a subsequent step and thanks to the reduced diameter of the capillary channels 11, a spontaneous upwelling by capillarity of the irrigation water L occurs from the first storage zone A1, defined in the airspace 7, towards the second storage zone A2, defined in the hollow body 14 immersed in the soil C for cultivating the plant.

Conveniently, this upwelling phenomenon continues until the second storage zone A2 is completely filled with the irrigation water L; as soon as this condition is attained, the hydraulic thrust exerted by the water stored in the zone A2 counterbalances the upwelling phenomenon due to capillarity, automatically interrupting the withdrawal of new water from the first storage zone A1.

In an additional step, the irrigation water L is delivered from the second storage zone A2 towards the soil C for cultivating the plant, after having crossing by diffusion the porous walls of the hollow body 14.

According to the invention, this step of water delivery by diffusion only occurs when the humidity of the soil C in which the hollow body 14 is immersed reduces as a consequence of the natural evaporation of the water and/or of the water consumption carried out by the plant.

In other words, the irrigation method of the invention advantageously enables to carry out in a spontaneous and "automatic" way a delivery of the irrigation water L to the soil C through the porous walls of the hollow body 14 only when needed.

In fact, said delivery spontaneously ends as soon as the humidity of the soil C rises up again to such a value as to block the diffusive transport mechanism of water from the second storage zone A2 to the soil C.

The delivery of the irrigation water from the hollow body 14 causes in its turn a reduction of the hydraulic thrust exerted by the water contained in the zone A2 on the water present in the capillary channels 11, and said reduction triggers again the upwelling phenomenon of the water L due to capillarity, with the withdrawal of additional liquid from the first storage zone A1.

In this way, a totally natural cycle of drying and humidification is triggered, with water withdrawal only when needed.

Advantageously, the storage zone A2 defined in the hollow body 14 is always filled with water, so that it is capable of promptly supplying water to the soil C as soon as this is needed.

Moreover, thanks to the substantially spherical shape of the hollow body 14, the step of delivering the irrigation water L can be carried out so as to involve the widest possible surface per volume unit of the hollow body 14, all to the advantage of a homogeneous distribution of the water in the soil C, and of the quantity of liquid deliverable to the same.

Finally, thanks to the definition of the storage zone A1 within the airspace 7, the container assembly 1 exhibits—the amount of soil to be irrigated being the same—a reduced overall size with respect to the container assemblies of the prior art, which are provided with a reservoir for storing the irrigation liquid beneath the soil container.

FIGS. 4–8 illustrate further embodiments of a delivering device and of a plant container according to the invention.

In the following description and in said figures, the elements of the delivering device 2 and of the plant container 3 which are structurally or functionally equivalent to those previously illustrated with reference to FIGS. 1–3 shall be indicated with the same reference numerals, and they shall not be described any further.

Figure 4:
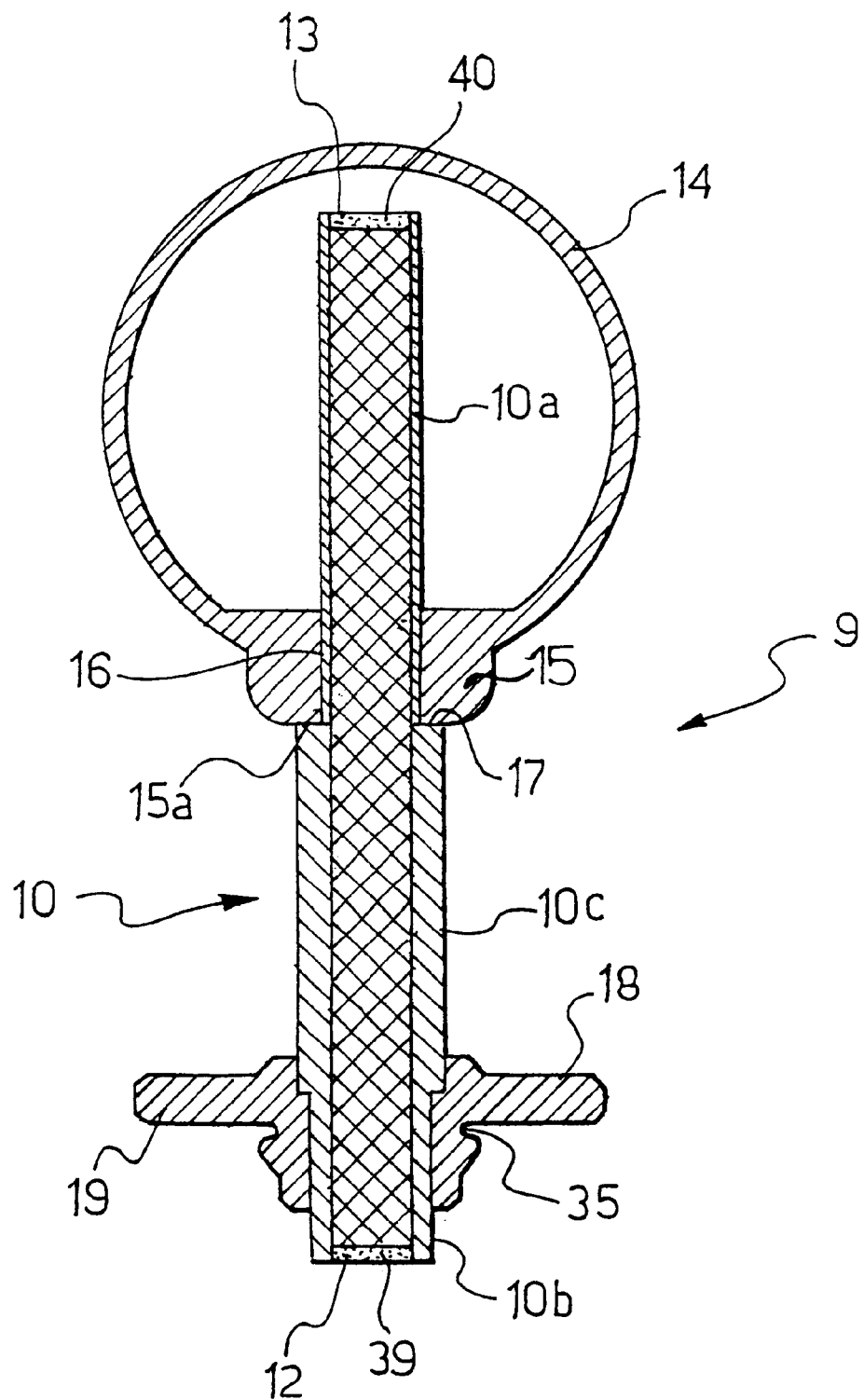
FIG. 4 shows an enlarged cross-sectional view of a further embodiment of the delivering device of the invention.

In an alternative embodiment of the delivering device 2, illustrated in FIG. 4, the shank 10 is substantially constituted by a hollow tube wherein a suitable liquid-permeable material adapted to promote—during use—the upwelling by capillarity of the irrigation water L from the first storage zone A1 to the second storage zone A2, is housed.

According to its physical shape, said material may be either inserted with shape coupling within the shank 10 if the same is a structurally continuous material, such as for example an extruded material, or it may be housed in loose form within the shank 10 wherein it is held by two inserts 39, 40, fastened to opposite inlet and outlet openings 12, 13 of the irrigation water into and from the shank 10.

Conveniently, the inserts 39, 40 are made of a suitable porous material adapted to allow the passage of the irrigation water L.

For the purposes of the invention, a suitable substantially liquid-permeable material, usable to fill the shank 10, may be selected from the group comprising: porous materials, fibrous materials, loose optionally porous granules, and loose fibers.

Among the structurally continuous porous materials, in particles or fibers that can be housed in loose form within the shank 10, terracotta, ceramics, porous plastics materials, such as for example porous polyethylene or porous polyurethane, or polyester fibers, are preferably used.

From what has been illustrated above, it may be immediately noted that the delivery of the irrigation water by this embodiment of the delivering device 2 essentially occurs according to the same method described for the previous embodiment, wherein the shank 10 is internally provided with the capillary channels 11.

Figure 5:
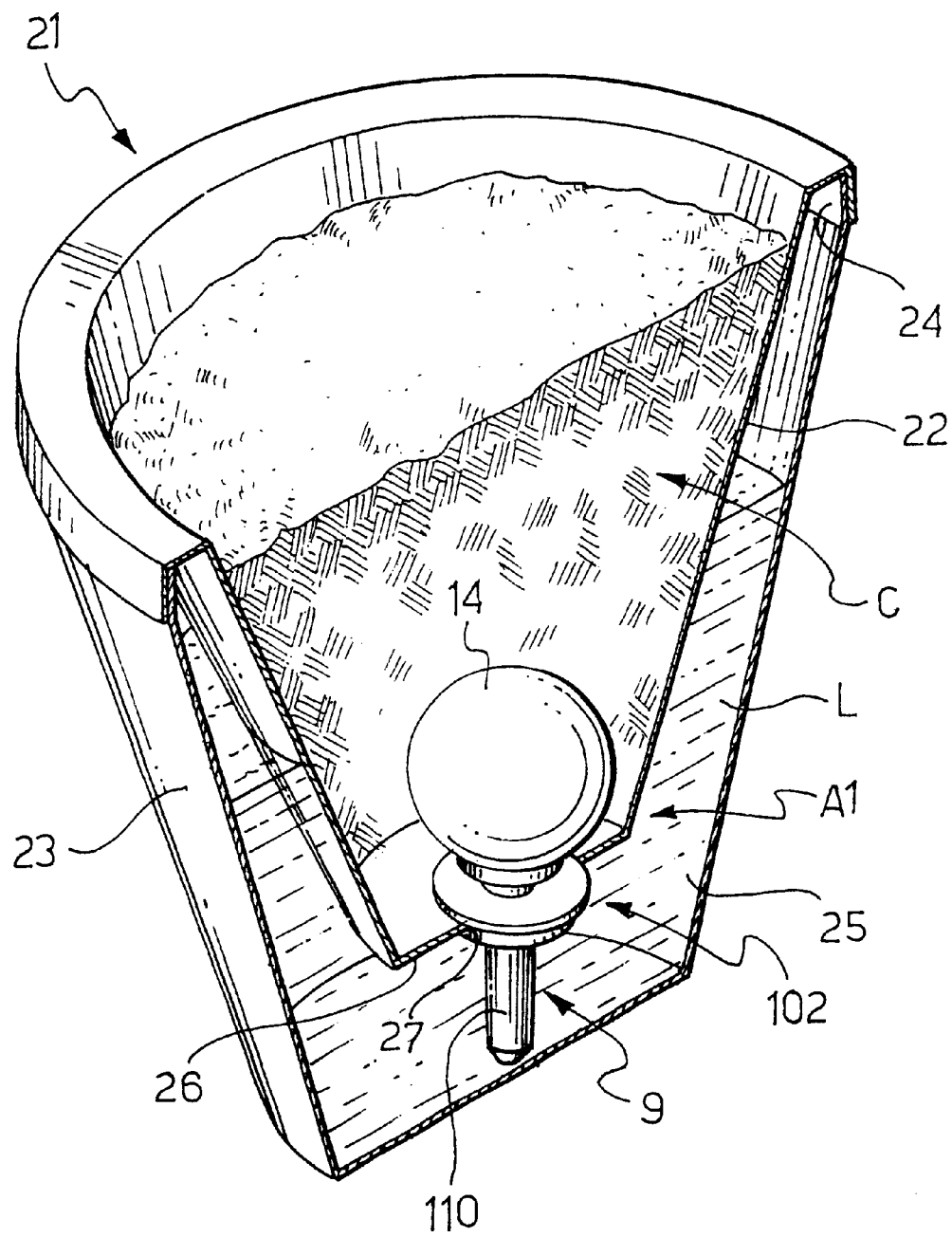
FIG. 5 shows a perspective cross-sectional view of a container for the cultivation of plants, including a second embodiment of a delivering device according to the invention.
Figure 6:
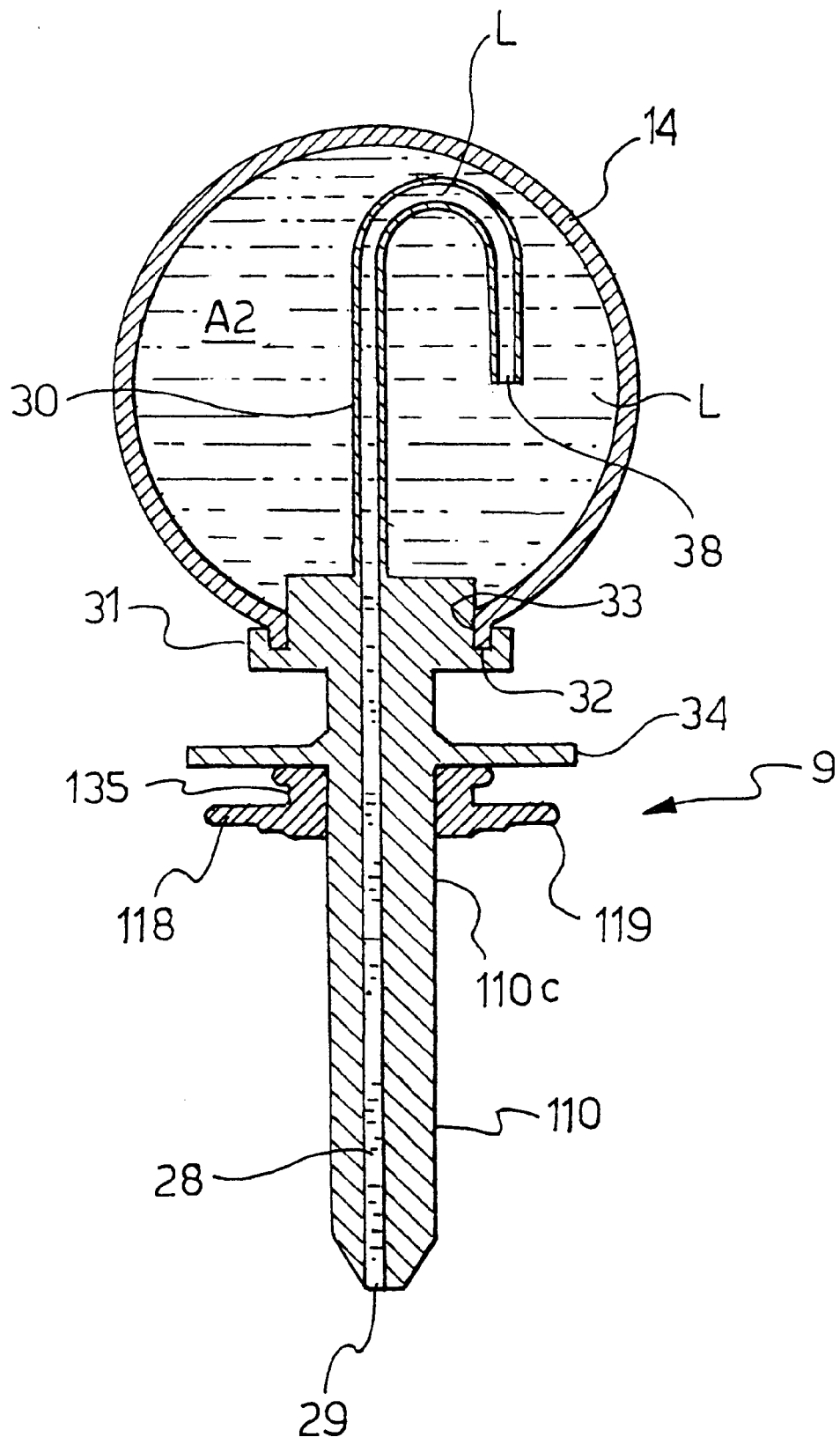
FIG. 6 shows an enlarged cross-sectional view of the delivering device of FIG. 5.

A further embodiment of a delivering device 102 according to the invention is illustrated in FIGS. 5 and 6, together with a further embodiment of a plant container 21 according to the invention.

In this embodiment, the container 21 comprises an inner container 22 for housing the soil C for cultivating a plant, and an outer container 23 which laterally encloses the inner container 22 to which it is fastened, preferably in a fluid-tight manner, for example glued, at its external edge 24. Alternatively, the container 21 may be integrally manufactured by molding a suitable material, for example plastics.

Thus, an airspace 25 is defined in the container 21 between the inner container 22 and the outer container 23, airspace in which the first storage zone A1 of the irrigation water L is defined.

Preferably, the airspace 25 is closed in a fluid-tight manner, in which case the container 21 is provided—in a known way—with a filling aperture (not illustrated) closed by a respective plug, conventional per se and as such, not shown.

Similarly to the pot 3 described before, the inner container 22 of the container 21 is provided with a bottom wall 26 provided in its turn with a through hole 27, through which the delivering device 102 is mounted in a liquid-tight manner.

Said device, illustrated in detail in FIG. 6, comprises an essentially cylindrical shank 110, made of a suitable substantially liquid-impermeable material as well, wherein a longitudinally non-capillary channel 28 provided with an inlet opening 29 for the irrigation water L is formed.

In the following description and in the subsequent claims, the expression "non-capillary channel" is used to indicate a channel having a diameter that, on the one hand, is sufficiently large so as not to trigger upwelling phenomena of the irrigation liquid due to capillarity, and on the other hand is sufficiently small so as to allow the upwelling of the irrigation liquid under the action of the hydraulic thrust exerted by the irrigation water L stored in the zone A1 and/or of the suction effect caused by the humidity reduction of the soil C, in its turn due to the evaporation of the irrigation water L or to its consumption by the plant.

By way of example, the non-capillary channel 28 could have a diameter of about 1 mm in case the irrigation liquid L is water.

The non-capillary channel 28 is in fluid communication with a substantially siphon-shaped duct 30 extending from the upper portion of the shank 110, to which it is fastened in a known way, for example through gluing, at an upper flange 31.

Alternatively, the duct 30 may be integral with the shank 110, for example by molding.

Similarly to what has been described above for the channel 28, the duct 30 is of the non-capillary type as well, i.e., it has a diameter that, on the one hand, is sufficiently large so as to not trigger the upwelling phenomena of the irrigation liquid due to capillarity and, on the other hand, is sufficiently small so as to allow the upwelling of the irrigation liquid under the action of the hydraulic thrust exerted by the irrigation water L stored in the zone A1 and/or of the suction effect caused by the humidity reduction of the soil C.

The substantially siphon-shaped duct 30 is essentially shaped as an upturned U and is provided with an outlet opening 38 of the irrigation water extending within the hollow body 14, that is, in the second storage zone A2 defined inside the body itself.

Thus, in this embodiment, the means for putting the inlet and outlet openings 29 and 38 of the elongated element in liquid communication with one another comprises both the non-capillary channel 28 and the substantially siphon-shaped duct 30.

Similarly to the embodiment illustrated in FIGS. 2 and 4, the hollow body 14 has a substantially spherical shape and is totally constituted by a suitable liquid-permeable material, such as for example terracotta.

In this case, the hollow body 14 is fastened in a liquid-tight manner, for example glued, to the shank 110 at its upper flange 31: to this end, the latter is provided with an annular seat 32 wherein the peripheral edge of an aperture 33 of the hollow body 14 is housed with mating engagement.

In this embodiment, the shank 110 of the delivering device 102 is mounted in a liquid-tight manner through the bottom wall 26 of the inner container 22 by means of a respective substantially annular sealing element 118 housed in the through hole 27 of the bottom wall 26.

Preferably, the sealing element 118 is coaxially mounted around a central portion 110c of the shank 110 and is provided with at least one flange 119 in abutting relationship with the bottom wall 26.

Also in this case, the sealing element is a one-piece element and is made of a suitable elastomeric material, such as for example silicone or polyurethane rubber.

Moreover, similarly to the previous embodiment, the sealing element 118 is provided with an annular groove 135 wherein the hole 27 of the bottom wall 26 is housed with shape coupling.

In order to impart additional stability to the delivering device 102 once it has been mounted through the bottom wall 26 of the inner container 22, the shank 110 is advantageously provided with a lower flange 34 against which the sealing element 118 abuts.

In an alternative embodiment of the sealing element 118, not shown, the latter may be essentially constituted by a sealing device of the stuffing box type comprising:
  i) a pair of substantially flange-shaped portions respectively supported above and beneath the bottom wall 26 of the inner container 22;
  ii) an annular gasket coaxially mounted around the shank 110 and interposed between said portions; and
  iii) driving means for pulling said substantially flange-shaped portions towards each other and compressing the annular gasket.

Advantageously, the driving means of this sealing device of the stuffing box type may consist of a known system comprising a bolt threaded at one end and a clamping nut in screwing engagement with said threaded end.

In this case, the annular gasket which may be employed—known per se—is preferably made of a suitable elastomeric material, such as for example the already mentioned silicone or polyurethane rubber.

The implementation of the method according to the invention for delivering the irrigation water L towards the soil C for cultivating a plant housed in the inner container 22 of container 21 differs from that previously described only as regards the upwelling step of the irrigation water L from the first storage zone A1 defined in the airspace 25 towards the second storage zone A2 defined in the hollow body 14.

In this case, in fact, the upwelling of the irrigation water L towards the second storage zone A2 is promoted, in an initial step, by the hydraulic thrust of the water present in the airspace 25, and once the steady operating conditions of the delivering device 102 have been reached, by the suction effect caused by the reduction of the soil humidity.

Thus, in the start-up condition, the level of the irrigation water L in the airspace 25 must be higher than the level reached by the upturned U curve of the substantially siphon-shaped duct 30, as schematically illustrated in FIG. 5.

Afterwards, and once the delivering device 102 has reached its steady operating conditions with the non-capillary channel 28 and duct 30 totally filled with the irrigation fluid, the upwelling of the irrigation water L towards the second storage zone A2 can simply occur thanks to the suction or subtraction effect caused by the humidity reduction of the soil.

Therefore, in this operating condition of the delivering device 102, the level of the irrigation water L in the airspace 25 may also be lower than the level reached by the upturned U curve of the substantially siphon-shaped duct 30.

As described above, the reduction of the soil humidity is in its turn due to the evaporation of the irrigation liquid and/or to its consumption by the plant.

Thus, in this embodiment, and for an optimum operation of the delivering device 102 it is preferable and advantageous that the airspace 25 of the container 21 be not sealed, but in gas communication with the outside, so as to have, on the surface of the water L stored in the zone A1, a pressure equal to the atmospheric pressure.

In a further embodiment, the container 21 may be provided with the delivering device 2 provided with means for the upwelling by capillarity of the irrigation liquid described above.

In this case, it is preferable and advantageous that the airspace 25 be air-tight so as to limit the losses—due to evaporation—of the irrigation water L stored in the zone A1 defined in the airspace 25. To this end, it is sufficient to provide the closing plug of the filling aperture of the airspace 25 with suitable sealing means which are capable to ensure a substantially air-tight closure of said aperture.

Figure 7:
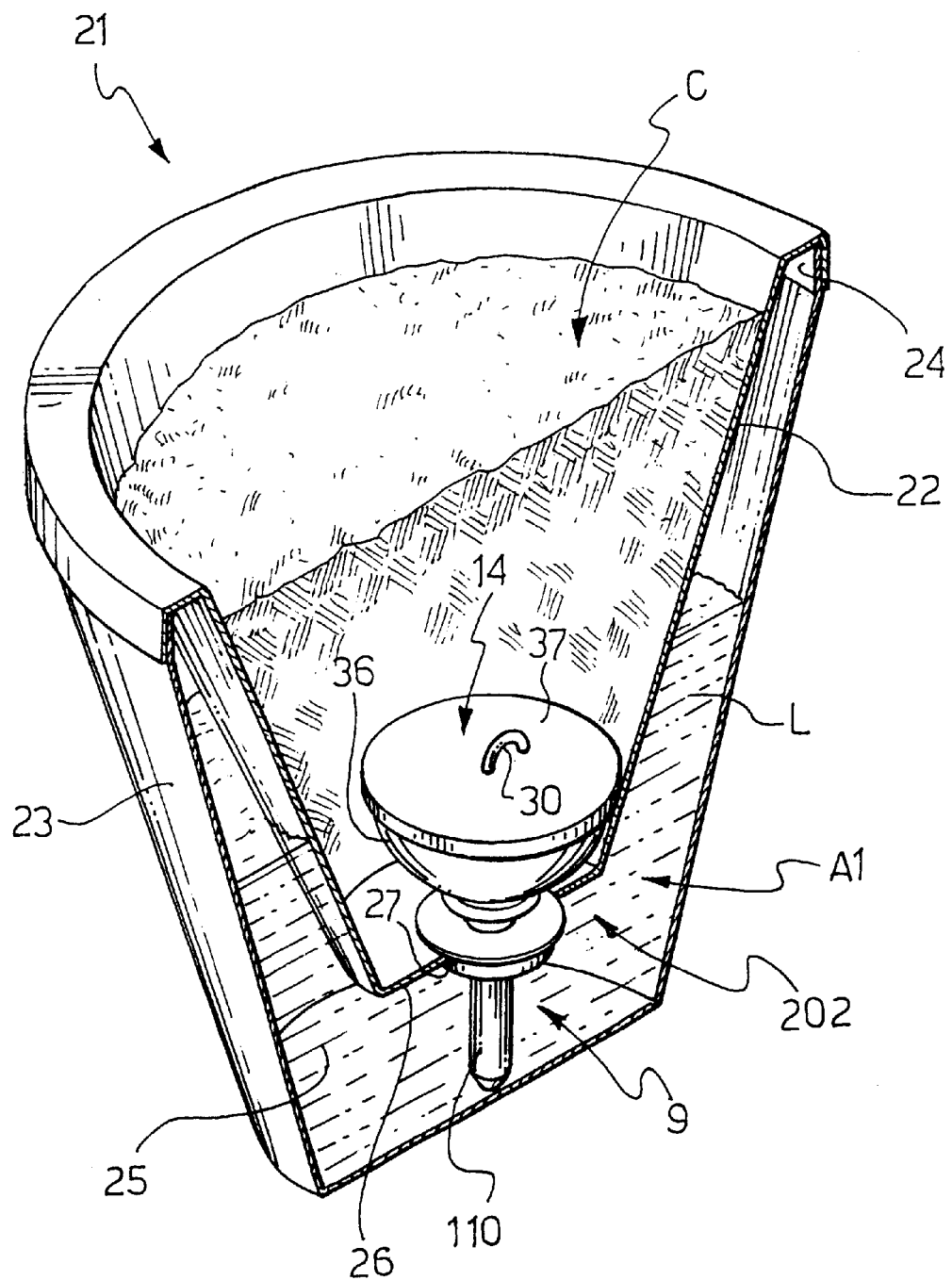
FIG. 7 shows a perspective cross-sectional view of a container for the cultivation of plants, including a third embodiment of a delivering device according to the invention.
Figure 8:
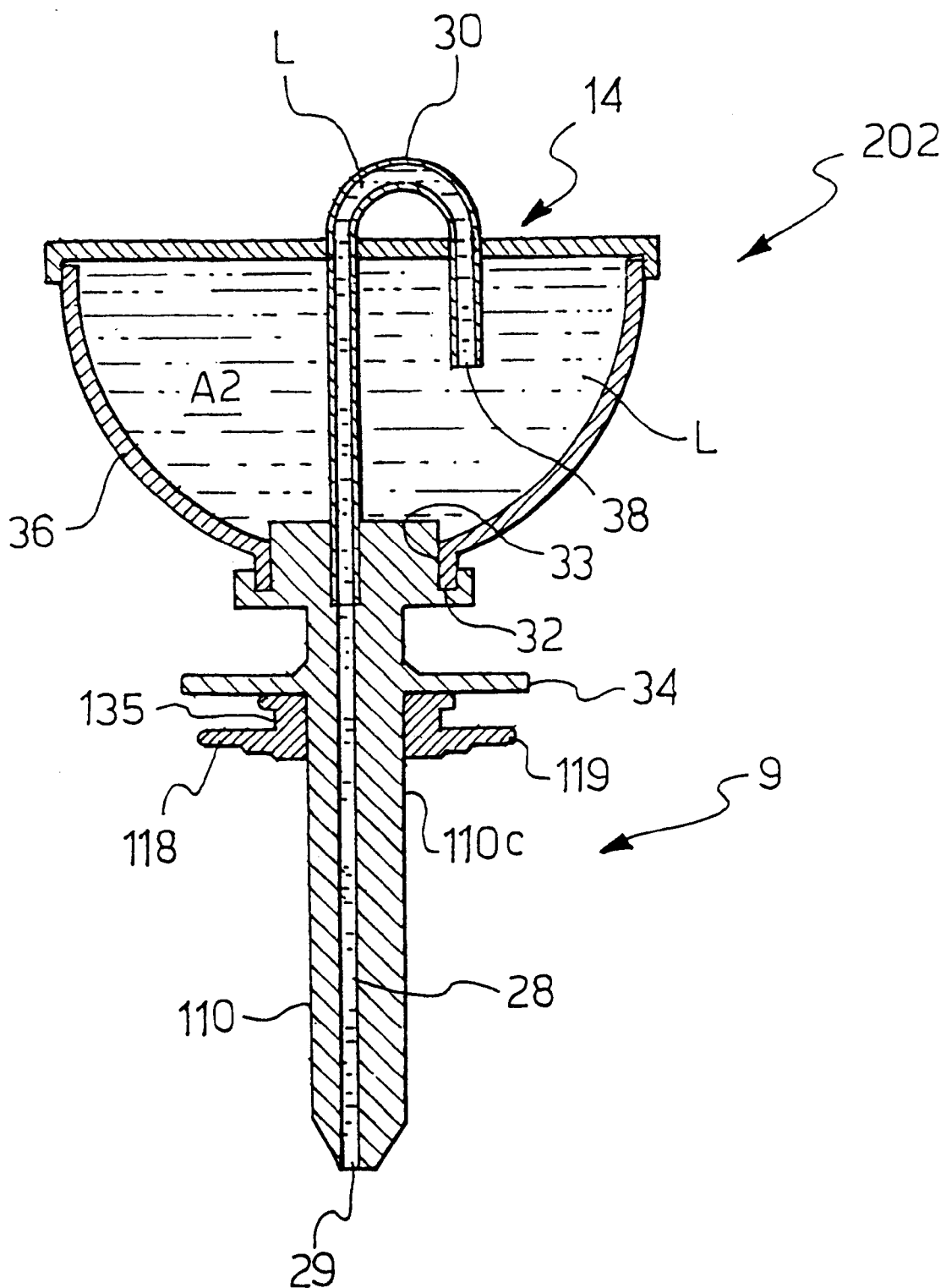
FIG. 8 shows an enlarged cross-sectional view of the delivering device of FIG. 7.

A further embodiment of a delivering device 202 according to the invention is illustrated in FIGS. 7 and 8.

In this embodiment, the hollow body 14 comprises a hemispheric portion 36, made of a liquid-permeable material, closed in a fluid-tight manner by a cover 37 at its top side.

The cover 37 may be made of either a liquid-permeable material, in which case it will contribute to the delivery of the irrigation water L by diffusion, or of a substantially liquid-impermeable material, in which case the delivery of the irrigation water L by diffusion will be carried out by the hemispheric portion 36.

From what has been illustrated above, it will be immediately evident that the implementation of the irrigation method of the invention by this embodiment of the delivering device 202 does not differ from that described with reference to the previous embodiment wherein the elongated element 9 is provided with a substantially siphon-shaped duct 30.

What is claimed is:

1. Device (2, 102, 202) for delivering an irrigation liquid (L) for the cultivation of plants, comprising an elongated element (9) for the capillary upwelling of the irrigation liquid (L) from a first storage zone (A1) of the irrigation liquid (L) to a plant cultivation medium (C), said elongated element (9) being provided with means for putting in liquid communication at least one liquid inlet opening (12, 29) to be positioned in the first storage zone (A1) with at least one liquid outlet opening (13, 38) to be positioned outside of the first storage zone (A1), and a hollow body (14) wherein a second storage zone (A2) of the irrigation liquid (L) is defined and which is intended to be immersed—during use—in the plant cultivation medium (C), said hollow body (14) being provided with at least one liquid-permeable portion (36) and being fastened in a liquid-tight manner to said elongated element (9) around said liquid outlet opening (13, 38), wherein the hollow body (14) is substantially entirely made of a liquid-permeable material.

2. Device (2, 102, 202) according to claim 1, wherein said at least one liquid-permeable portion (36) is made of a substantially non-compressible material.

3. Device (2, 102, 202) according to claim 1, wherein said elongated element (9) is substantially a hollow tubular element (10) and wherein the means for putting in fluid communication said liquid inlet (12) and outlet (13) openings of the elongated element (9) comprises at least one material housed in said tubular element (10) and adapted to promote—during use—the upwelling of the irrigation liquid (L) by capillarity from the first (A1) to the second (A2) storage zones.

4. Device (2, 102, 202) according to claim 3, wherein said at least one material is selected from the group comprising: porous materials, fibrous materials, loose, optionally porous, granules and loose fibers.

5. Device (2, 102, 202) for delivering an irrigation liquid (L) for the cultivation of plants, comprising an elongated element (9) for the capillary upwelling of the irrigation liquid (L) from a first storage zone (A1) of the irrigation liquid (L) to a plant cultivation medium (C), said elongated element (9) being provided with means for putting in liquid communication at least one liquid inlet opening (12, 29) to be positioned in the first storage zone (A1) with at least one liquid outlet opening (13, 38) to be positioned outside of the first storage zone (A1), and a hollow body (14) wherein a second storage zone (A2) of the irrigation liquid (L) is defined and which is intended to be immersed—during use—in the plant cultivation medium (C), said hollow body (14) being provided with at least one liquid-permeable portion (36) and being fastened in a liquid-tight manner to said elongated element (9) around said liquid outlet opening (13, 38), wherein the hollow body (14) has a substantially spherical shape.

6. Device (2, 102, 202) for delivering an irrigation liquid (L) for the cultivation of plants, comprising an elongated element (9) for the capillary upwelling of the irrigation liquid (L) from a first storage zone (A1) of the irrigation liquid (L) to a plant cultivation medium (C), said elongated element (9) being provided with means for putting in liquid communication at least one liquid inlet opening (12, 29) to be positioned in the first storage zone (A1) with at least one liquid outlet opening (13, 38) to be positioned outside of the first storage zone (A1), and a hollow body (14) wherein a second storage zone (A2) of the irrigation liquid (L) is defined and which is intended to be immersed—during use—in the plant cultivation medium (C), said hollow body (14) being provided with at least one liquid-permeable portion (36) and being fastened in a liquid-tight manner to said elongated element (9) around said liquid outlet opening (13, 38), wherein the means for putting in fluid communication said liquid inlet (12) and outlet (13) openings of the elongated element (9) comprises a plurality of channels (11) having a diameter adapted to promote—during use—the upwelling of the irrigation liquid (L) by capillarity from the fist (A1) to the second (A2) storage zones.

7. Device (2, 102, 202) for delivering an irrigation liquid (L) for the cultivation of plants, comprising an elongated element (9) for the capillary upwelling of the irrigation liquid (L) from a first storage zone (A1) of the irrigation liquid (L) to a plant cultivation medium (C), said elongated element (9) being provided with means for putting in liquid communication at least one liquid inlet opening (12, 29) to be positioned in the first storage zone (A1) with at least one liquid outlet opening (13, 38) to be positioned outside of the first storage zone (A1), and a hollow body (14) wherein a second storage zone (A2) of the irrigation liquid (L) is defined and which is intended to be immersed—during use—in the plant cultivation medium (C), said hollow body (14) being provided with at least one liquid-permeable portion (36) and being fastened in a liquid-tight manner to said elongated element (9) around said liquid outlet opening (13, 38), wherein said elongated element (9) is mounted through a bottom wall (4, 26) of a container (3, 22) for housing the plant cultivation medium (C).

8. Device (2, 102, 202) according to claim 7, wherein the elongated element (9) is mounted in a liquid-tight manner through the bottom wall (4, 26) of said container (3, 22) by means of a substantially annular sealing element (18, 118) mounted in a respective aperture (5, 27) formed in said bottom wall (4, 26).

9. Device (2, 102, 202) according to claim 8, wherein the sealing element (18, 118) is provided with at least one substantially flange-shaped portion (19, 119) in abutting relationship with said bottom wall (4, 26).

10. Device (2, 102, 202) according to claim 8, wherein the sealing element (18, 118) is a one-piece element made of an elastomeric material.

11. Device (2, 102, 202) according to claim 8, wherein the sealing element (18, 118) is substantially consisting of a sealing device of the stuffing box type comprising:

i) a pair of substantially flange-shaped portions, respectively supported above and beneath the bottom wall (4, 26) of said container (3, 22);

ii) an annular gasket coaxially mounted around said elongated element (9) and interposed between said portions; and iii) driving means for pulling said substantially flange-shaped portions towards each other and compressing the annular gasket.

12. Plant container (3, 21) comprising a delivering device (2, 102, 202) for delivering an irrigation liquid (L) for the cultivation of plants, comprising an elongated element (9) for the capillary upwelling of the irrigation liquid (L) from a first storage zone (A1) of the irrigation liquid (L) to a plant cultivation medium (C), said elongated element (9) being provided with means for putting in liquid communication at least one liquid inlet opening (12, 29) to be positioned in the first storage zone (A1) with at least one liquid outlet opening (13, 38) to be positioned outside of the first storage zone (A1), and a hollow body (14) wherein a second storage zone (A2) of the irrigation liquid (L) is defined and which is intended to be immersed—during use—in the plant cultivation medium (C), said hollow body (14) being provided with at least one liquid-permeable portion (36) and being fastened in a liquid-tight manner to said elongated element (9) around said liquid outlet opening (13, 38)

wherein the hollow body (14) is substantially entirely made of a liquid-permeable material.

13. Plant container (3, 21) according to claim 12, comprising an inner container (22) for housing a plant cultivation medium (C) and an outer container (23) fastened around said inner container (22) and defining an airspace (25) therewith, wherein said delivering device (2, 102, 202) is mounted in a liquid-tight manner through the bottom wall (26) of said inner container (22).

14. Plant container (3, 21) according to claim 13, wherein the first storage zone (A1) of the irrigation liquid (L) is defined in the airspace (25) formed between said containers (22, 23).

15. Container assembly (1) for the cultivation of plants comprising at least one pot (3) for housing a plant cultivation medium (C), provided with a bottom wall (4) and with a pot dish (6) forming with said pot (3) an airspace (7) wherein a first storage zone (A1) of an irrigation liquid (L) is defined, wherein said at least one pot (3) comprises a delivering device (2, 102, 202), and device (2, 102, 202) for delivering an irrigation liquid (L) for the cultivation of plants, comprising an elongated element (9) for the capillary upwelling of the irrigation liquid (L) from a first storage zone (A1) of the irrigation liquid (L) to a plant cultivation medium (C), said elongated element (9) being provided with means for putting in liquid communication at least one liquid inlet opening (12, 29) to be positioned in the first storage zone (A1) with at least one liquid outlet opening (13, 38) to be positioned outside of the first storage zone (A1), and a hollow body (14) wherein a second storage zone (A2) of the irrigation liquid (L) is defined and which is intended to be immersed—during use—in the plant cultivation medium (C), said hollow body (14) being provided with at least one liquid-permeable portion (36) and being fastened in a liquid-tight manner to said elongated element (9) around said liquid outlet opening (13, 38).

16. Container assembly (1) according to claim 15, further comprising a spacer (8) interposed between the pot (3) and the pot dish (6) to define said airspace (7).

* * * * *